United States Patent Office 3,737,416
Patented June 5, 1973

3,737,416
PROCESS FOR PREPARING AN ALTERNATING
COPOLYMER OF AN α-OLEFIN AND BUTADIENE
Kiyoshige Hayashi, Tokyo, and Akihiro Kawasaki and
Isao Maruyama, Ichihara-shi, Japan, assignors to
Maruzen Petrochemical Co., Ltd., Tokyo, Japan
No Drawing. Filed Mar. 3, 1971, Ser. No. 120,405
Claims priority, application Japan, Mar. 17, 1970,
45/21,994, 45/21,995; July 24, 1970, 45/64,344,
45/64,345; Nov. 6, 1970, 45/97,132, 45/97,133
Int. Cl. C08d 1/14, 3/06, 3/02
U.S. Cl. 260—82.1                                  13 Claims

ABSTRACT OF THE DISCLOSURE

Alternating copolymers of an α-olefin butadiene are formed by reaction in the presence of a catalyst comprising an organoaluminum compound having the formula $AlR_3$ wherein R represents a $C_1$–$C_{12}$ hydrocarbon radical selected from the group consisting of alkyl, cycloalkyl, aryl and aralkyl radicals and an organotitanium compound having

structure in the molecule wherein R is as defined above and X is halogen.

RELATED APPLICATION

This application is related to application Ser. No. 140,552, filed May 5, 1971, wherein alternating copolymers of $C_5$–$C_{12}$ conjugated dienes and α-olefins, and a process for preparing the same, are described.

BACKGROUND OF THE INVENTION (1) Field of the invention

The present invention relates to a process for preparing an alternating copolymer of an α-olefin having the general formula of $CH_2CHR$ wherein R represents a $C_1$–$C_{12}$ hydrocarbon radical selected from the group consisting of alkyl, cycloalkyl, aryl and aralkyl radicals and butadiene and a novel alternating copolymer of butadiene and said α-olefin.

(2) Description of the prior art

In order to obtain new and useful synthetic elastomers, many attempts have been made to produce alternating copolymer of a conjugated diene and an α-olefin. However, the copolymerization reaction is very difficult and, in general, it is not easy to produce even a random copolymer of conjugated diene and α-olefin by an ionic catalyst.

For example, Belgian Pat. 546,150 reports a process for preparing an amorphous copolymer of butadiene and an α-olefin having more than 3 carbon atoms by using a catalyst systems of trialkylaluminum and titanium tetrachloride at 50° C. The copolymer was determined to be amorphous from their X-ray measurements. The chemical configuration of the copolymer is not stereospecific. On the other hand, for example, an alternating copolymer of butadiene and propylene is also shown to be amorphous from its X-ray spectrum at room temperature, but it is a stereospecific copolymer and therefore it can crystallize on stretching or on cooling.

British Pat. 1,026,615 claims a process for preparing a random copolymer of butadiene and propylene by forming a catalyst system of trialkylaluminum and titanium tetrachloride in the presence of propylene, and then adding butadiene to the catalyst system. According to the patent, the propylene content of the copolymer was much higher than that of the copolymer prepared by the catalyst system formed in the absence of propylene. The patent also describes that analysis has shown that the copolymer obtained is a random copolymer and not blocked copolymer, but there are shown no experimental results which support the assumption.

British Pat. 1,108,630 shows a process for preparing a rubbery random copolymer of butadiene and propylene of high molecular weight with high content of propylene by using a three components catalyst system consisting of trialkylaluminum, iodine and a compound having the general formula of $TiBr_nCl_{4-n}$ wherein n is zero or an integer of 1 to 4. The microstructure of butadiene unit and the content of propylene unit in the copolymer are shown in the patent. But there are shown no experimental results which support the assumption that the copolymer should be a random copolymer of butadiene and propylene. A random copolymer of butadiene and propylene was also prepared by using a catalyst system consisting of triethylaluminum, titanium tetrachloride and polypropylene oxide. Polypropylene oxide was used as a randomizer and a copolymer of butadiene and propylene prepared by the catalyst system of triethylaluminum and titanium tetrachloride was shown to be block type from the results of oxidative decomposition reaction of the copolymer (Paper presented at 2nd Symposium on Polymer Synthesis, Tokyo, Oct. 5, 1968, The Society of Polymer Science, Japan).

At any rate, all of the methods described above relate to the methods for preparing a nonstereospecific or atactic copolymer. On the other hand, an alternating copolymer is stereospecific one and therefore these methods are not pertinent to the process of this invention.

Recently, Furukawa et. al. reported a process for preparing an alternating copolymer of butadiene and an α-olefin by using vanadyl (V) chloride-diethylaluminum monochloride-triethylaluminum catalyst system (22nd Annual Meeting of Japan Chemical Society, Tokyo, Mar. 31, 1969; J. Polymer Sci., B7, 671 (1969).

The methods for preparing an alternating copolymer of butadiene and an α-olefin by using an organoaluminum compound-vanadium (IV) chloride or vanadium (V) oxychloride-organic peroxide or chromium (VI) oxychloride catalyst system (Ger. Offen. 1,963,780), an organoaluminum compound-a vanadium compound having no vanadium-halogen linkage-a halogen compound catalyst system (Ger. Offen. 1,964,706; J. Polymer Science, B7, 613 (1969)) and an organoaluminum compound-a vanadium-halogen linkage-a compound having M—OR (M is an atom whose electronegativity is less than 2.2 and R is a hydrogen radical) linkage catalyst system (Ger. Offen. 2,020,168; Neth, appl. 7006067) were all proposed by us previously.

In short, the catalyst systems for alternating copolymerization described above employ an organoaluminum compound and a vanadium compound as indispensable elements of the catalyst systems. The microstructure of butadiene units in the alternating copolymer of butadiene and an α-olefin prepared by these catalyst systems was almost all trans-1,4-configuration, occasionally involving minor amounts of 1,2-configuration.

On the other hand, the most recently, we proposed the process for preparing an alternating copolymer of butadiene and an α-olefin by using the three components catalyst system of an organoaluminum compound, titanium tetrahalide and a carbonyl group containing compound Ger. Offen. 2,023,405, Neth, appl. 7006877). The alternating copolymer prepared by this catalyst system contains considerable amounts of cis-1,4-configuration butadiene unit, occasionally involving minor amounts of cis-1,2-configuration and moreover molecular weight of the alternating copolymer is remarkably higher than that of the one prepared by the organoaluminum—vanadium compound type catalyst system described above.

As far as the inventors know, with the exception of the methods described above, there is found to be no prior art in connection with an alternating copolymer of a conjugated diene and an α-olefin nor of a process for the preparation thereof.

SUMMARY OF THE INVENTION

Accordingly, an object of the present invention is to provide a process for preparing an alternating copolymer of butadiene and an α-olefin having a high molecular weight in a good yield.

It is a further object of this invention to provide a catalyst system giving high molecular weight alternating copolymer of butadiene and an α-olefin in a good yield.

In accordance with this invention, we have found that a high molecular weight alternating copolymer of butadiene and an α-olefin can be produced in a good yield by using a catalyst system comprising of the first component of an organoaluminum compound having the general formula of $AlR_3$ wherein R represents a hydrocarbon radical selected from the group consisting of a $C_1$–$C_{12}$, preferably $C_1$–$C_8$, and more preferably $C_2$–$C_6$, alkyl, cycloalkyl, aryl and aralkyl radicals and the second component of an organotitanium compound having $$TiXO\overset{O}{\underset{\|}{C}}R$$

(R is the same one as described above and X is a halogen) structure in the molecule or the catalyst system composed of the first component of an organoaluminum compound having the general formula of $AlR_3$, wherein R is as defined above, the second component of an organotitanium compound having $$TiXO\overset{O}{\underset{\|}{C}}R$$

(R and X are as described above) structure in the molecule and the third component of halogen, a halogen compound or a mixture thereof.

The alternating copolymers of this invention are rubber-like in character and can be used as polymeric plasticizers, in adhesives and can be vulcanized with sulfur or a sulfur compound to produce vulcanized elastomers.

The organoaluminum compounds which form the first component of the catalyst system of this invention are defined by the formula $AlR_3$ wherein R is a hydrocarbon radical selected from the group consisting of a $C_1$–$C_{12}$, preferably $C_1$–$C_8$, and more preferably $C_2$–$C_6$, alkyl, cycloalkyl, aryl and aralkyl radicals. Mixtures of these organoaluminum compounds may also be employed. Specific examples of compounds represented by the formula include trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl di-p-tolylaluminum, ethyl dibenzylaluminum, diethylphenylaluminum, diethyl-p-tolylaluminum, diethyl benzylaluminum and the like. Mixtures of these compounds may also be employed. Of these, it is usually preferred to employ trialkylaluminum compounds.

The organotitanium compounds having $$TiXO\overset{O}{\underset{\|}{C}}R$$

(R is a hydrocarbon radical selected from the group consisting of a $C_1$–$C_{12}$, preferably $C_1$–$C_8$, and more preferably $C_1$–$C_6$, alkyl, cycloalkyl, aryl and aralkyl radicals and X is halogen) structure in the molecule and forming the second component of the catalyst system of this invention, by no means limiting, are compounds shown by the general formulae of $$TiX\left(O\overset{O}{\underset{\|}{C}}R\right)_3,\ TiX_2\left(O\overset{O}{\underset{\|}{C}}R\right)_2,\ TiX_3\left(O\overset{O}{\underset{\|}{C}}R\right),$$

$$O\left[TiX_2\left(O\overset{O}{\underset{\|}{C}}R\right)\right]_2,\ O\left[TiX\left(O\overset{O}{\underset{\|}{C}}R\right)_2\right]_2,\ TiX(OR)\left(O\overset{O}{\underset{\|}{C}}R\right)_2,$$

$$TiX(OR)_2\left(O\overset{O}{\underset{\|}{C}}R\right)$$

etc. and mixtures thereof.

A mixture of an organotitanium compound having $$TiO\overset{O}{\underset{\|}{C}}R$$

(R is as defined above) structure and having no Ti—X linkage in the molecule and halogen, a halogen compound or a mixture thereof can be used as the second component of the catalyst of this invention, provided that said organotitanium compound can react with halogen, said halogen compound or the mixture thereof to produce an organotitanium compound having $$TiXO\overset{O}{\underset{\|}{C}}R$$

structure, in situ. Examples of such $$TiO\overset{O}{\underset{\|}{C}}R$$

structure containing compounds, by no means limiting, are the compounds shown by the general formulae of $$Ti\left(O\overset{O}{\underset{\|}{C}}R\right)_4,\ O\left[Ti\left(O\overset{O}{\underset{\|}{C}}R\right)_3\right]_2,\ Ti(OR)_3\left(O\overset{O}{\underset{\|}{C}}R\right),$$

$$Ti(OR)_2\left(O\overset{O}{\underset{\|}{C}}R\right)_2,\ Ti(OR)\left(O\overset{O}{\underset{\|}{C}}R\right)_3,\ TiO\left(O\overset{O}{\underset{\|}{C}}R\right)_2,$$

[structure showing Ti complex with two salicylate-type ligands]

etc. Examples of R radicals employed in the above organotitanium compounds are, by no means limiting, methyl, ethyl, n-propyl, isopropyl, n-butyl, isobutyl, tert-butyl, pentyl, hexyl, cyclohexyl, octyl, phenyl, p-tolyl, benzyl and other radicals.

The halogen compounds which form the third component of the catalyst system of this invention and also used as the halogen source for transforming the compounds having $$TiO\overset{O}{\underset{\|}{C}}R$$

structure to the second component of the catalyst system, by no means limiting, are the ones showing Lewis acid property such as compounds of the general formulae $VX_4$ (X is halogen hereinafter the same), $VOX_3$, $WX_6$, $MoX_5$, $CrO_2X_2$, $ZrX_4$, $FeX_3$, $BX_3$, $PX_5$, $SnX_4$, $SbX_5$, $AlOX$, $AlX_3$, $CuX$, $MnX_2$, $MgX_2$, $ZnX_2$, $HgX_2$, $BiX_3$ $NiX_2$, etc.; Lewis base complex compounds of the above mentioned halogen compounds showing Lewis acid property such as compounds of the general formulae $AlX_3 \cdot O(C_2H_5)_2$, $$BX_3 \cdot O(C_2H_5)_2,$$

$VOX_3 \cdot O(C_2H_5)_2$, $FeX_3 \cdot O(C_2H_5)_2$, $NiX_2 \cdot Py$ (Py represents pyridine), $HgX_2 \cdot Py$, etc.; organoaluminum compounds having Al—X linkage such as compounds of $$Al(OR)_nX_{3-n}$$

($n$ is a number from 1 to 2 and R is as defined above), $AlR_nX_{3-n}$ ($n$ is a number from 1 to 2 and R is as defined above), etc.; organotransition metal compounds having transition metal—X linkage such as compounds of the general formulae OV(OR)$_n$X$_{3-n}$ ($n$ is a number from 1 to 2), Ti(OR)$_4$X$_{4-n}$ ($n$ is a number from 1 to 3), Zr(OR)$_2$X$_2$, Zr(OR)$_3$X, OV(C$_5$H$_7$O$_2$)$_n$X$_{3-n}$ ($n$ is a number from 1 to 2), V(C$_5$H$_5$)$_n$X$_{4-n}$ ($n$ is a number from 1 to 2),

V(C$_5$H$_5$)$_2$X,

OV(C$_5$H$_5$)X$_2$, Ti(C$_5$H$_5$)$_2$X, Ti(C$_5$H$_5$)X$_3$, Ti(C$_5$H$_5$)$_2$X$_2$, (C$_5$H$_5$)Ti(OR)X$_2$, (C$_5$H$_5$)$_2$CrX, (C$_5$H$_5$)Mo(CO)$_3$X, (C$_5$H$_5$)$_2$IrX$_3$, etc.; acid halide; compounds having the general formula of $$\begin{array}{c} X \\ \diagdown \\ \phantom{X}C=O; \\ \diagup \\ X \end{array}$$

halogenated alkane compounds such as tert-butyl halide, sec-butyl halide, carbon tetrahalide, etc. and a mixture thereof.

The components of the catalyst system are normally employed in catalytic quantities. In the preferred embodiment the molar ratio of organoaluminum compound which forms the first component of the catalyst system of the present invention to organotitanium compound which forms the second component of the catalyst system should be in the range of 200 to 1 (200>Al/Ti>1), the optimum ratios will be found between 100 and 2 (100>Al/Ti>2).

In the preferred embodiment, the atomic ratio of titanium atom in the catalyst system of the present invention to halogen atom in the catalyst system should be in the range of 0.01 to 20 (0.01<Ti/X<20), the optimum ratios will be found between 0.02 and 10

(0.2<Ti/X<10)

The α-olefin used in this invention is one having the general formula:

CH$_2$=CHR wherein R is a hydrocarbon radical selected from the group consisting of a C$_1$-C$_{12}$, preferably C$_1$-C$_8$, and more preferably C$_1$-C$_6$, alkyl, cycloalkyl, aryl and aralkyl radical. Specific examples of compounds represented by the formula include propylene, butene-1, pentene-1, 4-methyl-pentene-1, hexene-1, 4-methyl-hexene-1, 5-methyl-hexene-1, heptene-1, 5-methylheptene-1, octene-1, decene-1, vinylcyclohexane, 4-methyl-1-vinylcyclohexane, styrene and the like. Mixtures of these α-olefin monomers may also be employed.

The molar ratio of conjugated diene to α-olefin in the initial monomer composition is not critical, but is usually within the range of 10/1 to 1/100 (10/1>diene/α-olefin>1/100), preferably be 10/2 to 1/50 (10/2>diene/α-olefin>1/50). It is noteworthy that, for example, when copolymerization reaction proceeds 50% by using a monomer mixture having the initial monomer composition of 1:50, the molar ratio of unreacted butadiene to unreacted α-olefin at this stage should be 1:99.

The manner for preparing the catalyst system of this invention has not been found to be critical. The organoaluminum compound which forms the first component of the catalyst system and the organotitanium compound which forms the second component of the catalyst system or the organoaluminum compound, the organotitanium compound and the halogen or halogen compound which forms the third component of the catalyst system of the present invention can be mixed per se or they can be mixed in the presence of an organic solvent. If a solvent is to be employed, the aromatic solvent such as benzene, toluene, xylene, etc.; the aliphatic hydrocarbon, e.g. propane, butane, pentane, hexane, heptane, cyclohexane, etc.; the halogenated hydrocarbon solvent such as trihaloethane, methylene halide, tetrahaloethylene, etc. are usually peferred.

In general, the organoaluminum compound which forms the first component of the catalyst system and the organotitanium compound which forms the second component of the catalyst system may be mixed at a temperature within a very wide range from −100° C. to +100° C., and preferably from −78° C. to +50° C. This temperature is shown as catalyst preparation temperature in the tables given hereinafter. The halogen or halogen compound which forms the third component of the catalyst system may be mixed with the other one or two components of the catalyst system of this invention at a temperature within a very wide range from −100° C. to +100° C., and preferably from −78° C. to +50° C.

The polymerization reaction may be carried out at a temperature within a range from −100° C. to +100° C., and preferably from −78° C. to +50° C.

The practice of this copolymerization is usually carried out in the presence of an organic solvent or diluent. However, this does not mean that this invention cannot be practiced in the form of bulk polymerization, i.e. without the use of solvent. If it is desired to use a solvent, the aromatic solvent such as benzene, toluene, xylene, etc.; the aliphatic hydrocarbon, e.g. propane, butane, pentane, hexane, heptane, cyclohexane, etc.; halogenated hydrocarbon solvent such as trihaloethane, methylene halide, tetrahaloethylene and the like may also be employed.

At the completion of the copolymerization reaction, the prduct may be precipitated and deashed by using a methanol-hydrochloric acid mixture. The precipitated product may be further washed with methanol for several times and dried under vacuum.

The catalyst system of the present invention employs an organoaluminum compound and a titanium compound as main components and in different from the alternating copolymer of butadiene and an α-olefin prepared by the organoaluminum—vanadium compound type catalyst system, the butadiene units of the alternating copolymer of butadiene and the α-olefin prepared by the methods of this invention contains considerable amounts of cis-1,4-structure and occasionally involves minor amounts of 1,2-structure. In other words, the structure of the alternating copolymer of butadiene and α-olefin prepared by the method of this invention resembles to that of the one prepared by the catalyst system of an organoaluminum compound, titanium tetrahalide and a carbonyl group containing compound (Ger. Offen. 2,023,405, Neth. appl. 7006877).

The invention will be illustrated with reference to the following examples.

EXAMPLE 1

The usual, dry, air-free technique was employed and 0.16 millimole organotitanium compound, 6.5 milliliters toluene and 0.2 millimole halogen compound were put successively into 25 milliliter glass bottles at 25° C. Then, the bottles were left alone at 25° C. for 10 minutes. Thereafter, the bottles were held in a low temperature bath at −78° C. (it corresponds to catalyst preparation temperature shown in Table 1) and 2.0 milliliters triisobutylaluminum solution in toluene (1 molar solution) and a mixture of 2.0 milliliters liquid propylene, 2 milliliters liquid butadiene and 2.0 milliliters toluene were put successively into the bottles also employing the usual, dry, air-free technique. Thereafter, the bottles were sealed and allowed to copolymerize at −30° C. for 16 hours. The results were summarized in Table 1.

The molecular weight of the MEK soluble fraction of the alternating copolymer was lower than that of the MEK insoluble and diethyl ether soluble fraction of the alternating copolymer. Therefore, it is concluded that the yield of the high molecular weight fraction in Exp. No. 4 obtained by the two components catalyst system of $$\text{Al(iBu)}_3\text{—TiCl}_3\text{O}\overset{\overset{\text{O}}{\|}}{\text{C}}\text{CH}_3$$

is lower than that of the ones in Exp. No. 1–3 obtained by the three components catalyst systems of $$\text{Al(iBu)}_3\text{—TiCl}_3\text{O}\overset{\overset{\text{O}}{\|}}{\text{C}}\text{CH}_3\text{-halogen compound.}$$

TABLE 1

| Example number | Catalysts* | | | | Catalyst preparation temperature (°C.) | Polymerization conditions | | Yield of alternating copolymer of butadiene and propylene | |
|---|---|---|---|---|---|---|---|---|---|
| | Organotitanium compound | | Halogen or halogen compound | Mmol | | Temperature (°C.) | Time (hr.) | MEK soluble fraction (g.) | MEK insoluble, diethyl ether soluble fraction (g.) |
| | Al(i-Bu)$_3$ (mmol) | TiCl$_3$OCCH$_3$ (mmol) | | | | | | | |
| 1 | 2.0 | 0.16 | SnCl$_4$ | 0.2 | −78 | −30 | 16 | 0.16 | 1.09 |
| 2 | 2.0 | 0.16 | BF$_3$·OEt$_2$ | 0.2 | −78 | −30 | 16 | 0.40 | 0.61 |
| 3 | 2.0 | 0.16 | C$_6$H$_5$COCl | 0.2 | −78 | −30 | 16 | 0.24 | 0.58 |
| 4 | 2.0 | 0.16 | | | −78 | −30 | 16 | 0.40 | 0.34 |

*Al(i-Bu)$_3$=triisobutylaluminum, BF$_3$·OET$_2$=boron trifluoride etherate, C$_6$H$_5$COCl=benzoyl chloride.

EXAMPLE 2

The usual, dry, air-free technique was employed and 0.2 millimole organotitanium compound, 6.5 milliliters toluene and 0.5 millimole halogen or halogen compound were put successively into 25 milliliter glass bottles at 25° C. Then the bottles were left alone at 25° C. for 10 minutes. Thereafter, the bottles were held in a low temperature bath at −78° C. (it corresponds to catalyst preparation temperature shown in Table 2) and 2.0 milliliters triisobutylaluminum solution in toluene (1 molar solution) and a mixture of 2.0 milliliters liquid propylene, 2.0 milliliters liquid butadiene and 2.0 milliliters toluene were put successively into the bottles also employing the usual, dry, air-free technique. Thereafter, the bottles were sealed and allowed to copolymerize at −30° C. for 16 hours. The results were summarized in Table 2.

The catalyst systems shown in Refs. 1 and 2 gave no alternating copolymer.

EXAMPLE 3

The usual, dry, air-free technique was employed and 8.0 milliliters toluene and varying amounts of organotitanium compound

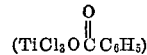

were put successively into 25 milliliter glass bottles at 20° C. Then, the bottles were held in a constant temperature bath showing a predetermined temperature (it corresponds to catalyst preparation temperature given in Table 3 listed below) and varying amounts of organoaluminum compound solution in toluene (1 molar solution) were put into the bottles. Thereafter, the bottles were held in a low temperature bath at −78° C. and a mixture of 2.0 milliliters liquid propylene, 2.0 milliliters liquid butadiene and 2 milliliters toluene was put into the bottles also employing the usual, dry, air-free technique. Then, the bottles were sealed and allowed to copolymerize at predetermined temperature and for predetermined time. The results were summarized in Table 3.

TABLE 2

| Example number | Catalysts * | | | | | Catalyst preparation temperature (°C.) | Polymerization conditions | | Yield of alternating copolymer of butadiene and propylene | |
|---|---|---|---|---|---|---|---|---|---|---|
| | Al(i-Bu)$_3$ (mmol) | Organotitanium compound | Mmol | Halogen or halogen compound | Mmol | | Temperature (°C.) | Time (hr.) | MEK soluble fraction (g.) | MEK insoluble, diethyl ether soluble fraction (g.) |
| 1 | 2.0 | O[Ti(OAc)$_3$]$_2$ | 0.2 | AlCl$_3$·OEt$_2$ | 0.5 | −78 | −30 | 16 | 0.24 | 0.25 |
| 2 | 2.0 | O[Ti(OAc)$_3$]$_2$ | 0.2 | AlEtCl$_2$ | 0.5 | −78 | −30 | 16 | 0.15 | 0.10 |
| 3 | 2.0 | O[Ti(OAc)$_3$]$_2$ | 0.2 | SnCl$_4$ | 0.5 | −78 | −30 | 16 | 0.01 | 0.08 |
| 4 | 2.0 | O[Ti(OAc)$_3$]$_2$ | 0.2 | I$_2$ | 0.5 | −78 | −30 | 16 | 0.07 | 0.32 |
| Ref. 1 | 2.0 | O[Ti(OAc)$_3$]$_2$ | 0.2 | | | −78 | −30 | 16 | 0 | 0 |
| 5 | 2.0 | Ti(Oi-Pr)$_2$(OAc)$_2$ | 0.2 | VOCl$_3$ | 0.5 | −78 | −30 | 16 | 1.46 | 0.74 |
| 6 | 2.0 | Ti(Oi-Pr)$_2$(OAc)$_2$ | 0.2 | I$_2$ | 0.5 | −78 | −30 | 16 | 0.11 | 0.06 |
| Ref. 2 | 2.0 | Ti(Oi-Pr)$_2$(OAc)$_2$ | 0.2 | | | −78 | −30 | 16 | 0 | 0 |

*Al(i-Bu)$_3$=triisobutylaluminum, O[Ti(OAc)$_3$]$_2$=O[Ti(OCCH$_3$)$_3$]$_2$, Ti(Oi-Pr)$_2$(OAc)$_2$=Ti[OCH(CH$_3$)CH$_3$]$_2$·[OCCH$_3$]$_2$, AlCl$_3$·OEt$_2$=aluminum chloride etherate.

TABLE 3

| Example number | Catalysts* | | | Catalyst preparation temperature (°C.) | Polymerization conditions | | Alternating copolymer of butadiene and propylene | | | | |
|---|---|---|---|---|---|---|---|---|---|---|---|
| | Organoaluminum compound | Mmol | TiCl$_3$OCC$_6$H$_5$ (mmol) | | Temperature (°C.) | Time (hr.) | Yield (g.) | Intrinsic viscosity [η] (dl./g.)** | Microstructure of butadiene unit | | |
| | | | | | | | | | Cis (percent) | Trans (percent) | 1,2 (percent) |
| 1 | Al(i-Bu)$_3$ | 0.25 | 0.10 | −30 | −40 | 16 | 1.92 | 3.47 | 11 | 86 | 3 |
| 2 | Al(i-Bu)$_3$ | 0.25 | 0.10 | −20 | −40 | 16 | 1.89 | 4.31 | 12 | 85 | 3 |
| 3 | Al(i-Bu)$_3$ | 0.25 | 0.10 | −10 | −40 | 16 | 1.78 | 4.59 | 13 | 84 | 3 |
| 4 | Al(i-Bu)$_3$ | 0.25 | 0.025 | 0 | −40 | 16 | 1.14 | 4.81 | 22 | 75 | 3 |
| 5 | Al(i-Bu)$_3$ | 0.50 | 0.025 | −78 | −30 | 16 | 0.13 | | | | |
| 6 | Al(i-Bu)$_3$ | 0.50 | 0.05 | −78 | −30 | 16 | 0.34 | | | | |
| 7 | Al(i-Bu)$_3$ | 0.50 | 0.10 | −78 | −30 | 16 | 0.77 | | | | |
| 8 | Al(i-Bu)$_3$ | 0.50 | 0.18 | −78 | −30 | 16 | 1.41 | 2.01 | 7 | 89 | 4 |
| 9 | Al(i-Bu)$_3$ | 0.50 | 0.20 | −78 | −30 | 16 | 1.46 | 1.98 | | | |
| 10 | Al(i-Bu)$_3$ | 0.50 | 0.23 | −78 | −30 | 16 | 1.47 | 1.62 | 6 | 90 | 4 |
| 11 | Al(i-Bu)$_3$ | 0.50 | 0.25 | −78 | −30 | 16 | 1.02 | | | | |
| 12 | Al(i-Bu)$_3$ | 0.50 | 0.275 | −78 | −30 | 16 | 0.64 | | | | |
| 13 | Al(i-Bu)$_3$ | 0.30 | 0.10 | −30 | −37 | 17.5 | 1.81 | 3.24 | 12 | 86 | 2 |
| 14 | Al(i-Bu)$_3$ | 0.30 | 0.10 | −78 | 20 | 25 | 1.21 | 0.62 | | | |
| 15 | AlEt$_3$ | 0.50 | 0.20 | −78 | −30 | 16 | 0.80 | | | | |

*Al(i-Bu)$_3$=triisobutylaluminum, AlEt$_3$=triethylaluminum.
**Measured in chloroform at 30° C.

EXAMPLE 4

The usual, dry, air-free technique was employed and 8.0 milliliters toluene and varying amounts of organotitanium compound were put successively into 25 milliliter glass bottles at 20° C. Then, the bottles were held in a constant temperature bath showing predetermined temperature (it corresponds to catalyst preparation temperature given in Table 4) and varying amounts of organoaluminum compound solution in toluene (1 molar solution) were put into the bottles. Thereafter, the bottles were held in a low temperature bath at −78° C. and a mixture of 2.0 milliliters liquid propylene, 2.0 milliliters liquid butadiene and 2.0 milliliters toluene was put into the bottles also employing the usual, dry, air-free technique. Then, the bottles were sealed and allowed to copolymerize at predetermined temperature for 16 hours. The results were summarized in Table 4.

EXAMPLE 5

The usual, dry, air-free technique was employed and 8.0 milliliters toluene and varying amounts of organotitanium compound were put successively into 25 milliliter glass bottles at 20° C. Then, the bottles were held in a low temperature bath at −78° C. (it corresponds to catalyst preparation temperature given in Table 5) and varying amounts of triisobutylaluminum solution in toluene (1 molar solution) and a mixture of 2.0 milliliters liquid propylene, 2.0 milliliters liquid butadiene and 2.0 milliliters toluene were put successively into the bottles also employing the usual, dry, air-free technique. Then, the bottles were sealed and allowed to copolymerize at predetermined temperature and for predetermined time. The results were summarized in Table 5.

EXAMPLE 6

The usual, dry, air-free technique was employed and 7.0 milliliters toluene, varying amounts of organotitanium compound and varying amounts of halogen compound were put successively into 25 milliliter glass bottles at 20° C. Then, the bottles were held in a low temperature bath at −78° C. (it corresponds to catalyst preparation temperature given in Table 6) and varying amounts of organoaluminum compound solution in tolune (1 molar solution) and a mixture of 2.0 milliliters liquid propylene, 2.0 milliliters liquid butadiene and 2.0 milliliters toluene were put successively into the bottles also employing the usual, dry, air-free technique. Then, the bottles were sealed and allowed to copolymerize at predetermined temperature and for predetermined time. The results were summarized in Table 6.

TABLE 4

| | Catalysts | | | Polymerization conditions | | Alternating copolymer of butadiene and propylene | | | | |
|---|---|---|---|---|---|---|---|---|---|---|
| | Organoaluminum | | Organotitanium compound, $TiCl_3OCC_6H_5$ (with O double bond) | Catalyst preparation temperature | Temperature | Time | Yield | Intrinsic viscosity | Microstructure of butadiene unit | | |
| Example number | compound | Mmol | (mmol) | (° C.) | (° C.) | (hr.) | (g.) | $[\eta]$ (dl./g.)* | Cis (percent) | Trans (percent) | 1,2 (percent) |
| 1 | Al(i-Bu)₃ | 1.00 | 0.23 | −78 | −30 | 16 | 2.62 | 1.02 | | | |
| 2 | Al(i-Bu)₃ | 1.00 | 0.05 | −78 | −30 | 16 | 0.10 | | 35 | 57 | 8 |
| 3 | Al(i-Bu)₃ | 0.50 | 0.05 | −78 | −30 | 16 | 0.79 | | 28 | 66 | 6 |
| 4 | Al(i-Bu)₃ | 0.25 | 0.05 | −78 | −30 | 16 | 1.25 | | 20 | 77 | 3 |
| 5 | Al(i-Bu)₃ | 0.15 | 0.05 | −78 | −30 | 16 | 0.36 | | 47 | 50 | 3 |
| 6 | Al(i-Bu)₃ | 0.30 | 0.10 | −30 | −37 | 16 | 1.57 | 2.05 | 18 | 78 | 4 |
| 7 | Al(i-Bu)₃ | 0.25 | 0.06 | −60 | −30 | 16 | 1.46 | 1.50 | | | |
| 8 | Al(i-Bu)₃ | 0.25 | 0.06 | −40 | −30 | 16 | 1.17 | 1.44 | | | |
| 9 | Al(i-Bu)₃ | 0.25 | 0.06 | −20 | −30 | 16 | 1.17 | 1.55 | | | |
| 10 | Al(i-Bu)₃ | 0.25 | 0.06 | 0 | −30 | 16 | 0.98 | 1.99 | | | |
| 11 | Al(i-Bu)₃ | 0.25 | 0.06 | −78 | −20 | 16 | 1.57 | 1.12 | | | |
| 12 | Al(i-Bu)₃ | 0.25 | 0.06 | −78 | −10 | 16 | 1.56 | 1.04 | | | |
| 13 | AlEt₃ | 0.50 | 0.20 | −78 | −30 | 16 | 0.33 | 0.70 | | | |

*Measured in chloroform at 30° C.

TABLE 5

| | Catalyst* | | | Catalyst preparation temperature (° C.) | Polymerization conditions | | Alternating copolymer of butadiene and propylene | | | | |
|---|---|---|---|---|---|---|---|---|---|---|---|
| Example number | Al(i-Bu)₃ (mmol) | Organotitanium compound | Mmol | | Temperature (° C.) | Time (hr) | Yield (g.) | Intrinsic viscosity $(\eta)$ (dl./g.)** | Cis (percent) | Trans (percent) | 1,2 (percent) |
| 1 | 0.3 | $TiCl_2(OCEt)_2$ | 0.1 | −78 | −30 | 17 | 0.37 | | 18 | 77 | 5 |
| 2 | 0.7 | Same as above | 0.1 | −78 | −30 | 17 | 0.26 | | | | |
| 3 | 0.3 | $O[TiCl(OCEt)_2]_2$ | 0.05 | −78 | −30 | 17 | 0.10 | | 20 | 68 | 12 |
| 4 | 0.7 | Same as above | 0.05 | −78 | −30 | 17 | 0.09 | | | | |
| 5 | 0.3 | $TiCl_2(OCEt)_2$ | 0.1 | −78 | 20 | 25 | 0.36 | 0.72 | 32 | 55 | 13 |

*$TiCl_2(OCEt)_2 = TiCl_2O(CC_2H_5)$, $O[TiCl(OCEt)_2]_2 = O[TiCl(OCC_2H_5)_2]_2$ (all carbonyl O double-bonded).
**Measured in chloroform at 30° C.

EXAMPLE 7

The usual, dry, air-free technique was employed and 7.0 milliliters varying amounts of organotitanium compound and varying amounts of halogen compound were put successively into 25 milliliter glass bottles at 20° C. Then, the bottles were held in a constant temperature bath showing predetermined temperature (it corresponds to catalyst preparation temperature given in Table 7) and varying amounts of organoaluminum compound solution in toluene (1 molar solution) were put into the bottles. Thereafter, the bottles were held in a low temperature bath at −78° C. and a mixture of 2.0 milliliters liquid propylene, 2.0 milliliters liquid butadiene and 2.0 milliliters toluene was put into the bottles respectively also employing the usual, dry, air-free technique. Then, the bottles were sealed and allowed to copolymerize at predetermined temperature and for predetermined time. The results were summarized in Table 7.

TABLE 6

| | Catalysts* | | | | | Polymerization conditions | | Alternating copolymer of butadiene and propylene | | | |
|---|---|---|---|---|---|---|---|---|---|---|---|
| | Organo-aluminum compound | | Organo-titanium compound | Halogen compound | | Catalyst preparation temperature (°C.) | Temperature (°C.) | Time (hr.) | Yield (g.) | Microstructure of butadiene unit | | |
| Example number | | Mmol | | | Mmol | | | | | Cis (percent) | Trans (percent) | 1,2 (percent) |
| 1 | Al(i-Bu)₃ | 0.5 | TiCl₂(OCEt)₂ | tert-BuCl | 0.1 | −78 | 20 | 25 | 0.73 | 23 | 70 | |
| 2 | Al(i-Bu)₃ | 5.0 | Same as above | tert-BuCl | 0.05 | −78 | −40 | 15.5 | 0.19 | 40 | 35 | 25 |
| 3 | Al(hexyl)₃ | 0.5 | do | FeCl₃ | 0.2 | −78 | −40 | 15.5 | 0.68 | 25 | 70 | 5 |
| 4 | Al(i-Bu)₃ | 2.0 | do | MoCl₅ | 0.2 | −78 | −40 | 15.5 | 0.49 | 18 | 80 | 2 |

*TiCl₂(OCEt)₂=TiCl₂(O$\overset{\text{O}}{\overset{\|}{C}}$CEt)₂, tert-BuCl=tert-butyl chloride, Al(hexyl)₃=trihexylaluminum.

TABLE 7

| | Catalysts* | | | | | | Polymerization conditions | | Alternating copolymer of butadiene and propylene | | | | |
|---|---|---|---|---|---|---|---|---|---|---|---|---|---|
| | Organoaluminum compound | Mmol | Organotitanium compound | Mmol | Halogen compound | Mmol | Catalyst preparation temperature (°C.) | Temperature (°C.) | Time (hr.) | Yield (g.) | Intrinsic viscosity [η](dl./g.)** | Microstructure of butadiene unit | | |
| Example number | | | | | | | | | | | | Cis (percent) | Trans (percent) | 1,2 (percent) |
| 1 | Al(i-Bu)₃ | 1.0 | O[Ti(OAc)₃]₂ | 1.0 | AlCl₃·OEt₂ | 0.1 | −78 | 20 | 22 | 1.66 | 0.6 | 26 | 63 | 11 |
| 2 | Al(i-Bu)₃ | 0.5 | O[Ti(OAc)₃]₂ | 0.5 | C₆H₅COCl | 0.1 | −78 | 20 | 22 | 0.15 | | 22 | 65 | 13 |
| 3 | AlEt₃ | 1.0 | O[Ti(OCEt)₃]₂ | 1.0 | CrO₂Cl₂ | 0.2 | 0 | 0 | 91 | 0.01 | | | | |
| 4 | Al(i-Bu)₃ | 1.0 | Same as above | | AlEt₂Cl | 0.2 | −40 | −40 | 28.5 | 0.20 | | 25 | 67 | 8 |
| 5 | Al(i-Bu)₃ | 2.0 | A | | AlCl₃·OEt₂ | 0.2 | −78 | 20 | 48 | 0.05 | | 18 | 54 | 28 |
| 6 | AlEt₃ | 2.0 | A | | AlCl₃·OEt₂ | 0.2 | −78 | 20 | 48 | 0.11 | | 10 | 66 | 24 |

* O[Ti(OAc)₃]₂=O[Ti(OCCH₃)₃]₂, O[Ti(OCEt)₃]₂=O[Ti(OCC₂H₅)₃]₂, A =

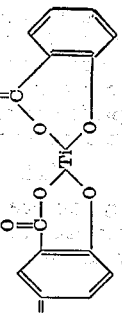

** Measured in chloroform at 30° C.

EXAMPLE 8

The usual, dry, air-free technique was employed and 8.0 milliliters toluene and varying amounts of organotitanium compound were put successively into 25 milliliter glass bottles at 20° C. Then, the bottles were held in a low temperature bath at −20° C. (it corresponds to catalyst preparation temperature shown in Table 8) and 1.00 milliliter triisobutylaluminum solution in toluene (1 molar solution) was put into the bottles respectively. Thereafter, the bottles were held in a low temperature bath at −78° C. and varying amounts of liquid propylene and varying amounts of liquid butadiene were put successively into the bottles also employing the usual, dry, air-free technique. Then, the bottles were sealed and allowed to copolymerize at predetermined temperature for 16 hours. The results were summarized in Table 8.

the bottle was held in a low temperature bath at −78° C. and 0.60 milliliter triisobutylaluminum solution in toluene (1 molar solution), 1.0 milliliter liquid butadiene and 5.0 milliliters liquid propylene were put successively into the bottle also employing the usual, dry, air-free technique. Thereafter, the bottle was sealed and allowed to copolymerize at 40° C. for 1.5 hours. The yield of the alternating copolymer was 0.06 g.

EXAMPLE 11

The usual, dry, air-free technique was employed and 8.0 milliliters toluene, 0.15 millimole

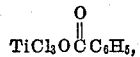

TABLE 8

| Example number | Catalyst Organotitanium compound, Al(i-Bu)₃ (mmol) | TiCl₃OCC₆H₅ (mmol) | Catalyst preparation temperature (°C.) | Monomers Liquid propylene (ml.) | Liquid butadiene (ml.) | Polymerization condition Temperature (°C.) | Time (hr.) | Alternating copolymer of butadiene and propylene Yield (g.) | Intrinsic viscosity [η](dl./g.)* | Microstructure of butadiene unit Cis (percent) | Trans (percent) | 1,2 (percent) |
|---|---|---|---|---|---|---|---|---|---|---|---|---|
| 1 | 1.00 | 0.41 | −20 | 4.0 | 0.4 | 0 | 16 | 0.69 | | 17 | 80 | 3 |
| 2 | 1.00 | 0.41 | −20 | 4.0 | 0.8 | 0 | 16 | 1.05 | 0.66 | 16 | 79 | 5 |
| 3 | 1.00 | 0.41 | −20 | 4.0 | 0.4 | −40 | 16 | 0.43 | 0.88 | 4 | 96 | 0 |
| 4 | 1.00 | 0.41 | −20 | 4.0 | 0.8 | −40 | 16 | 0.15 | 1.25 | 6 | 93 | 1 |
| 5 | 1.00 | 0.44 | −20 | 2.0 | 2.0 | −40 | 16 | 1.89 | 4.84 | | | |
| 6 | 1.00 | 0.44 | −20 | 2.5 | 2.0 | −40 | 16 | 1.67 | 4.00 | 13 | 85 | 2 |
| 7 | 1.00 | 0.44 | −20 | 3.0 | 2.0 | −40 | 16 | 0.86 | 3.40 | | | |
| 8 | 1.00 | 0.44 | −20 | 4.0 | 2.0 | −40 | 16 | 0.86 | 3.10 | 10 | 88 | 2 |
| 9 | 1.00 | 0.44 | −20 | 5.0 | 2.0 | −40 | 16 | 0.26 | 2.84 | 12 | 86 | 2 |

*Measured in chloroform at 30° C.

EXAMPLE 9

The usual, dry, air-free technique was employed and 0.06 millimole

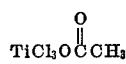

was put into a 25 milliliter glass bottle at 20° C. Then, the bottle was held in a low temperature bath at −78° C. and 0.25 milliliter triisobutylaluminum solution in toluene (1 molar solution), 10.0 milliliters liquid propylene and 2.0 milliliters liquid butadiene were put successively into the bottle also employing the usual, dry, air-free technique. Thereafter, the bottle was sealed and allowed to copolymerize at −30° C. for 16 hours. The yield of the alternating copolymer of butadiene and propylene was 0.73 g. Intrinsic viscosity of the copolymer was 0.92 (dl./g.).

EXAMPLE 10

The usual, dry, air-free technique was employed and 8.0 milliliters toluene and 0.06 millimole

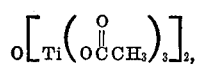

were put into a 25 milliliter glass bottle at 20° C. Then, 2.0 milliliters liquid butadiene, 2.0 milliliters liquid propylene and 0.5 milliliter triisobutylaluminum solution in toluene (1 molar solution) were put successively into a 25 milliliter glass bottle at −30° C. Then, the bottle was sealed and allowed to copolymerize at −40° C. for 15.5 hours. The yield of the alternating copolymer was 1.63. The microstructure of butadiene unit of the copolymer was as follows: cis, 2%; trans, 95%; 1,2, 3%.

EXAMPLE 12

The usual, dry, air-free technique was employed and 7.0 milliliters toluene, 0.2 millimole

2.0 milliliters triisobutylaluminum solution in toluene (1 molar solution) and 0.5 millimole AlCl₃·O(C₂H₅)₂ were put successively into a 25 milliliter glass bottle at −40° C. Then, the bottle was held in a low temperature bath at −78° C. and a mixture of 2.0 milliliters liquid propylene, 2.0 milliliters liquid butadiene and 2.0 milliliters toluene was put into the bottle also employing the usual, dry, air-free technique. Thereafter, the bottle was sealed and allowed to copolymerize at −40° C. for 18 hours. The yield of the MEK soluble alternating copolymer of butadiene and propylene was 0.10 g. and that of the MEK insoluble, diethyl ether soluble fraction was 0.09 g. The microstructure of butadiene unit of the latter fraction was as follows: cis, 20%; trans, 65%; 1,2, 15%.

EXAMPLE 13

The usual, dry, air-free technique was employed and 10.0 milliliters toluene, 0.05 milliliter tert-butylchloride solution in toluene (1 molar solution) and 0.4 milliliter triisobutylaluminum solution in toluene (1 molar solution) were put into a 25 milliliter glass bottle at 25° C. Then the bottle was held in a low temperature bath at −32° C. and 0.12 millimole

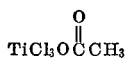

was put into the bottle. Thereafter, the bottle was held in a low temperature bath at −78° C. and a mixture of 2.0 milliliters liquid propylene, 2.0 milliliters liquid butadiene and 2.0 milliliters toluene was put into the bottle also employing the usual, dry, air-free technique. Then, the bottle was sealed and allowed to copolymerize at −40° C. for 16 hours. The yield of the alternating copolymer of butadiene and propylene was 1.37 g. and its intrinsic viscosity was 2.8 (dl./g.) in toluene at 30° C. By using the two components catalyst system of 0.4 millimole triisobutylaluminum and 0.12 millimole

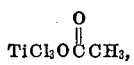

butadiene and propylene alternating copolymerization reaction was carried out. The yield of the alternating copolymer was 1.18 g. and its intrinsic viscosity was 2.65 (dl./g.) in toluene at 30° C. From the experiments, the effect obtained by the addition of halogen compound can be found.

EXAMPLE 14

The usual, dry, air-free technique was employed and 7.0 milliliters toluene and varying amounts of organotitanium compound were put into 25 milliliter glass bottles at 20° C. Then, the bottles were held in a constant temperature bath showing predetermined temperature (it corresponds to catalyst preparation temperature given in Table 9) and varying amounts of organoaluminum compound solution in toluene (1 molar solution) was put into the bottles respectively. Thereafter, the bottles were held in a low temperature bath at −78° C. and varying amounts of liquid α-olefin and 2.0 milliliters liquid butadiene were put successively into the bottles also employing the usual, dry, air-free technique. Then, the bottles were sealed and allowed to copolymerize at predetermined temperature and for predetermined time. The results were summarized in Table 9.

TABLE 9

| Example number | Catalysts | | | | Catalyst preparation temperature (° C.) | Monomers* | | | | Polymerization condition | | Alternating copolymer of butadiene and copolymer of α-olefin | |
|---|---|---|---|---|---|---|---|---|---|---|---|---|---|
| | Organoaluminum compound | Mmol | Organotitanium compound | Mmol | | Liquid α-olefin | Ml. | Liquid butadiene | Ml. | Temperature (° C.) | Time (hr.) | Yield (g.) | Intrinsic viscosity [η] (dl./g.)** |
| 1 | Al(i-Bu)₃ | 0.5 | TiCl₃OCCH₃ | 0.1 | −78 | Styrene | 3.0 | BD | 2.0 | −30 | 21 | 0.14 | |
| 2 | Al(i-Bu)₃ | 0.5 | Same as above | 0.1 | −78 | Butene-1 | 2.0 | BD | 2.0 | −30 | 16 | 1.38 | 1.28 |
| 3 | Al(i-Bu)₃ | 0.6 | TiCl₃OCC₆H₅ | 0.06 | −40 | 4-M-P-1 | 2.0 | BD | 2.0 | −40 | 21 | 0.18 | |
| 4 | Al(hexyl)₃ | 0.5 | TiCl₂(OCEt)₃ | 0.2 | 0 | Hexene-1 | 6.0 | BD | 1.0 | 40 | ½ | 0.61 | 0.8 |

*4-M-P-1=4-methyl-penten-1, BD=butadiene.
**Measured in chloroform at 30° C.

EXAMPLE 15

The usual, dry, air-free technique was employed and 7.0 milliliters toluene, 0.2 millimole organotitanium compound and varying amounts of halogen compound were put successively into 25 milliliter glass bottles at 20° C. Then, the bottles were held in a constant temperature bath showing given predetermined temperature (it corresponds to catalyst preparation temperature given in Table 10) and varying amounts of organoaluminum compound solution in toluene (1 molar solution) were put into the bottles respectively. Thereafter, the bottles were held in a low temperature bath at −78° C. and vary amounts of liquid α-olefin and 2.0 milliliters liquid butadiene were put successively into the bottles also employing the usual, dry, air-free technique. Then, the bottles were sealed and allowed to copolymerize at predetermined temperature and for predetermined time. The results were summarized in Table 10.

TABLE 10

| Example | Catalysts | | | | Catalyst preparation temperature (°C.) | Monomers* | | | | Polymerization conditions | | | Yield of alternating copolymer of butadiene and α-olefin (g.) |
|---|---|---|---|---|---|---|---|---|---|---|---|---|---|
| | Organo-aluminum compound | Mmol | Organotitanium compound | Mmol | Halogen compound | Mmol | | Liquid α-olefin | Ml. | Liquid butadiene | Ml. | Temperature (°C.) | Time (hr.) | |
| 1 | Al(hexyl)$_3$ | 2.0 | O[Ti(OAc)$_3$]$_2$ | 0.2 | MoCl$_5$ | 0.2 | Butene-1 | 2.0 BD | 2.0 | −40 | 43 | 0.04 |
| 2 | AlEt$_3$ | 5.0 | O[Ti(OAc)$_3$]$_2$ | 1.0 | FeCl$_3$ | 0.2 | Pentene-1 | 5.0 BD | 2.0 | 0 | 19 | 0.18 |
| 3 | Al(hexyl)$_3$ | 1.0 | TiCl$_2$(OCEt)$_2$ | 0.3 | AlEtCl$_2$ | 0.2 | Hexene-1 | 2.0 BD | 2.0 | −40 | 21 | 0.05 |

*BD=butadiene.

EXAMPLE 16

The usual, dry, air-free technique was employed and 7.0 milliliters toluene and varying amounts of organotitanium compound were put successively into 25 milliliter glass bottles at 20° C. Then, the bottles were held in a low temperature bath at −78° C. (it corresponds to catalyst preparation temperature given in Table 11) and varying amounts of triisobutylaluminum solution in toluene (1 molar solution), 2.0 milliliters liquid butadiene and varying amounts of liquid α-olefin were put successively into the bottles also employing the usual, dry, air-free technique. Thereafter, the bottles were sealed and allowed to copolymerize at predetermined temperature and for predetermined time. The results were summarized in Table 11.

TABLE 11

| Example number | Catalysts | | | | Catalyst preparation temperature (°C.) | Monomers* | | | | Polymerization conditions | | Yield of alternating copolymer of butadiene and α-olefin (g.) |
|---|---|---|---|---|---|---|---|---|---|---|---|---|
| | Al(i-Bu)$_3$ (mmol) | Organotitanium compound | Mmol | | | Liquid α-olefin | Ml. | Liquid butadiene | Ml. | Temperature (°C.) | Time (hr.) | |
| 1 | 1.0 | TiCl(OCEt)$_3$ (O=) | 0.2 | | −78 | Butene-1 | 4.0 | BD | 2.0 | 0 | 21 | 0.18 |
| 2 | 0.5 | TiCl$_3$(OCCH$_3$) (O=) | 0.02 | | −78 | Pentene-1 | 2.8 | BD | 2.0 | −30 | 16 | 0.03 |
| 3 | 0.5 | Same as above | 0.1 | | −78 | do | 2.8 | BD | 2.0 | −30 | 16 | 1.80 |

*BD=butadiene.

EXAMPLE 17

The usual, dry, air-free technique was employed and 7.0 milliliters toluene, 0.2 milliliter organotitanium compound and varying amounts of halogen compound were put successively into 25 milliliter glass bottles at 20° C. Then, the bottles were held in a constant temperature bath showing predetermined temperature (it corresponds to catalyst preparation temperature) and 1.0 milliliter organoaluminum compound solution in toluene (1 molar solution) was put into the bottles respectively. Thereafter, the bottles were held in a low temperature bath at −78° C. and 2.0 milliliters liquid butadiene and varying amounts of liquid α-olefin were put successively into the bottles also employing the usual, dry air-free technique. Then, the bottles were sealed and allowed to copolymerize at predetermined temperature for 21 hours. The results were summarized in Table 12.

EXAMPLE 18

The usual, dry, air-free technique was employed and 4.0 milliliters toluene and 0.2 millimole $$TiCl_3O\overset{O}{\overset{\|}{C}}CH_3$$

were put into a 25 milliliter glass bottle at 20° C. Then the bottle was held in a low temperature bath at −78° C. and 1.0 milliliter triisobutylaluminum solution in toluene (1 molar solution) and 6.0 milliliters liquid B—B fraction were put successively into the bottle also employing the usual, dry, air-free technique. Thereafter, the bottle was sealed and allowed to copolymerize at −30° C. for 24 hours. The yield of alternating copolymer of butadiene and butene-1 was 0.55 g.

The molar composition of the B—B fraction used was as follows:

| | Mole percent |
|---|---|
| Propane | 0.03 |
| Propylene | 0.05 |
| Methylacetylene | 0.69 |
| Isobutane | 0.52 |
| n-Butane | 3.67 |
| Isobutylene | 26.22 |
| Butene-1 | 14.18 |
| Trans-butene-2 | 5.18 |
| Cis-butene-2 | 4.12 |
| 1,3-butadiene | 44.02 |
| 1,2-butadiene | 0.52 |
| Ethyl acetylene | 0.16 |
| Vinyl acetylene | 0.64 |

EXAMPLE 19

5.91 kg. alternating copolymer of butadiene and propylene was prepared from 8.10 kg. propylene and 8.50 kg. butadiene at −40° C. for 17.5 hours. The catalyst used was prepared from 1.11 moles tributylaluminum and 0.44 mole $$TiCl_3O\overset{O}{\overset{\|}{C}}C_6H_5$$

at −20° C. The number average molecular weight of the copolymer was 93,500.

The vulcanization was carried out in the following way: 100 parts of copolymer, 50 parts of oil furnace black (HAF), 5 parts of zinc oxide, 1.5 parts of sulphur, 1 part of stearic acid, 1 part of phenyl-β-naphthyl amine and 1 part of benzothiazyl disulfide were mixed on a roller and vulcanized at 150° C. for 20 minutes.

The product obtained by the vulcanization had the following values:

Elongation at break at 25° C. _____ percent__ 390
Tensile strength at 25° C. _____ kg./cm.² __ 226
Modulus 300% at 25° C. _____ kg./cm.² __ 156

TABLE 12

| Example number | Catalysts | | | | | Monomers* | | | Polymerization conditions | | | Alternating copolymer of butadiene and α-olefin | |
|---|---|---|---|---|---|---|---|---|---|---|---|---|---|
| | Organoaluminum compound | Mmol | Organotitanium compound | Halogen compound | Mmol | Catalyst preparation temperature (°C.) | Liquid α-olefin | Ml. | Liquid butadiene | Ml. | Temperature (°C.) | Time (hr.) | Yield (g.) | Intrinsic viscosity [η] (dl./g.)** |
| 1 | Al(i-Bu)₃ | 1.0 | TiCl(OCEt)₃ (with C=O) | CrO₂Cl₂ | 0.2 | −78 | Butene-1 | 4.0 | BD | 2.0 | 0 | 21 | 0.26 | |
| 2 | AlEt₃ | 1.0 | O[TiCl(OCEt)₂]₂ (with C=O) | AlCl₃·OEt₂ | 0.2 | −40 | ___do___ | 2.0 | BD | 2.0 | 0 | 21 | 0.34 | 0.82 |
| 3 | AlEt₃ | 1.0 | TiCl₃(OOCC₆H₅) (with C=O) | I₂ | 0.06 | −40 | Pentene-1 | 2.0 | BD | 2.0 | −40 | 21 | 0.21 | |

*BD=butadiene. **Measured in chloroform at 30° C.

EXAMPLE 20

The usual, dry, air-free technique was employed and 7.0 milliliters toluene, 0.2 millimole

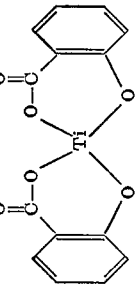

and 0.5 millimole stannic chloride were put successively into a 25 milliliter glass bottle at 20° C. Then, the bottle was held in a low temperature bath at −40° C. and 1.0 milliliter triethylaluminum solution in toluene (1 molar solution) was put into the bottle. Thereafter, the bottle was held in a low temperature bath at −78° C. and 4.0 milliliters liquid pentene-1 and 2.0 milliliters liquid butadiene were put successively into the bottle also employing the usual, dry, air-free technique. Then, the bottle was sealed and allowed to copolymerize at 20° C. for 48 hours. MEK soluble alternating copolymer of butadiene and pentene-1 was obtained. It's yield was 0.40 g.

What is claimed is:

1. A process for preparing 1:1 copolymer of butadiene and an α-olefin having alternating butadiene and α-olefin units, said α-olefin having the general formula of CH$_2$=CHR wherein R represents a C$_1$-C$_{12}$ hydrocarbon radical selected from the group consisting of alkyl, cycloalkyl, aryl and aralkyl radicals which comprises contacting said butadiene and said α-olefin in liquid phase with a catalyst composed of (A) an organoaluminum compound having the general formula of AlR$_3$ wherein R is as defined above and (B) an organotitanium compound having

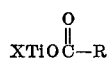

(R is as defined above and X is halogen) structure in the molecule.

2. A process as claimed in claim 1 wherein a halogen, a halogen compound selected from the group consisting of a halide or oxyhalide having Lewis acid property, a Lewis base complex compound of said halide or oxyhalide, an organoaluminum compound having Al—X linkage (X is halogen), an organotransition metal compound having transition metal—X linkage (X is halogen), an acid halide, a compound having the general formula of

(X is halogen) and a halogenated alkane or a mixture thereof, is further included as a component of the catalyst.

3. A process as claimed in claim 1 wherein the atomic ratio of aluminum atom contained in the organoaluminum compound to titanium atom contained in the organotitanium compound is within a range from 1 to 200.

4. A process as claimed in claim 2 wherein the atomic ratio of titanium atom contained in the organotitanium compound to the halogen or halogen atom contained in the halogen compound is within a range from 0.01 to 20.

5. A process as claimed in claim 1 wherein the molar ratio of butadiene to said α-olefin in the initial monomer composition is within a range from 10:1 to 1:100.

6. A process as claimed in claim 1 wherein said organoaluminum compound and said organotitanium compound are mixed at a temperature within a range from −100° C. to +100° C.

7. A process as claimed in claim 2 wherein said halogen, halogen compound or a mixture thereof is mixed with the other catalyst components at a temperature within a range from −100° C. to +100° C.

8. A process as claimed in claim 1 wherein polymerization reaction is carried out at a temperature within a range from −100° C. to +100° C.

9. A process as claimed in claim 8 wherein said temperature is within a range from −78° C. to +50° C.

10. A process as claimed in claim 3 wherein the molar ratio of butadiene to said α-olefin in the initial monomer composition is within a range from 5:1 to 1:50, the atomic ratio of aluminum atom contained in the organo aluminum compound to titanium atom contained in the organotitanium compound is within a range from 2 to 100, said organoaluminum compound and said organotitanium compound are mixed at a temperature within a range from −78° C. to +50° C., and polymerization temperature is within a range from −78° C. to +50° C.

11. A process as claimed in claim 10 wherein the R used in the general formula to identify said α-olefin represents C$_1$-C$_6$ hydrocarbon radical, and the R used in the general formula to identify said organoaluminum compound represents C$_2$-C$_6$ hydrocarbon radical.

12. A process as claimed in claim 4 wherein the molar ratio of butadiene to said α-olefin in the initial monomer composition is within a range from 5:1 to 1:50, the atomic ratio of aluminum atom contained in the organoaluminum compound to titanium contained in the organotitanium compound is within a range from 2 to 100, the atomic ratio of titanium atom contained in the organotitanium compound to the halogen or halogen atom contained in the halogen compound is within a range from 0.02 to 10, the catalyst components are mixed at a temperature within a range from −78° C. to +50° C. and polymerization reaction is carried out at a temperature within a range from −78° C. to +50° C.

13. A process as claimed in claim 12 wherein the R used in the general formula to identify said α-olefin represents a C$_1$-C$_6$ hydrocarbon radical, and the R used in the general formula to identify said organoaluminum compound represents a C$_2$-C$_6$ hydrocarbon radical.

References Cited

UNITED STATES PATENTS

| | | | |
|---|---|---|---|
| 3,590,024 | 6/1971 | Ishizuka et al. | 260—85.3 R |
| 3,652,518 | 3/1972 | Kawasaki et al. | 260—85.3 R |
| 3,652,519 | 3/1972 | Kawasaki et al. | 260—85.3 R |
| 3,217,496 | 5/1967 | Natta et al. | 260—88.2 |
| 3,470,144 | 9/1969 | Minekawa et al. | 260—85.3 |

FOREIGN PATENTS

| | | | |
|---|---|---|---|
| 1,010,790 | 11/1965 | Great Britain | 260—85.3 |
| 1,026,615 | 4/1966 | Great Britain | 260—85.3 |
| 1,108,630 | 4/1968 | Great Britain | 260—85.3 |
| 546,150 | 9/1956 | Belgium | 260—85.3 |

JOSEPH L. SCHOFER, Primary Examiner

A. HOLLER, Assistant Examiner

U.S. Cl. X.R.

260—84.1, 85.3 R

UNITED STATES PATENT OFFICE
CERTIFICATE OF CORRECTION

Patent No. 3,737,416                Dated June 5, 1973

Inventor(s)  AKIHIRO KAWASAKI et al

It is certified that error appears in the above-identified patent and that said Letters Patent are hereby corrected as shown below:

Column 1, line 4 - Delete "Kiyoshige Hayashi" from identification of inventors;

lines 9-10 - Delete "July 24,1970...45/97,133" from identification of priority claims;

line 15 - After "α-olefin" insert ---and---.

Column 2, line 2 - Delete "blocked" and replace with ---block---;

line 48 - Before "vanadium-halogen" insert ---vanadium compound having---:

line 49 - Delete "hydrogen" and replace with ---hydrocarbon---;

line 65 - Before "Ger." insert ---(---.

Column 5, line 44 - Delete "methylheptene" and replace with ---methyl-heptene---;

-1-

Signed and Sealed this ninth Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,737,416　　　　　　　　　Dated June 5, 1973

Inventor(s) AKIHIRO KAWASAKI et al　　　　　Page 2

It is certified that error appears in the above-identified patent and that said Letters Patent are hereby corrected as shown below:

Column 5, line 48 - Delete "conjugated diene" and replace with ---butadiene---;

line 72 - Rewrite "peferred" as ---preferred---.

Column 6, line 24 - Rewrite "prduct" as ---product---.

Column 7, Table 1 - In footnote "BF$_3$.OET$_2$" should be deleted and rewritten as ---BF$_3$·OEt$_2$---.

Column 8, Table 2, last column - In heading delete "d ethyl" and rewrite as ---diethyl---.

Column 9, Table 5, third column - Re Examples 1, 3 and 5, the compounds should be written to include  ;

In first footnote, second compound should be written as

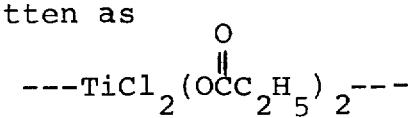

Signed and Sealed this ninth Day of September 1975

[SEAL]

Attest:

RUTH C. MASON　　　　　　　　C. MARSHALL DANN
Attesting Officer　　　　　Commissioner of Patents and Trademarks

UNITED STATES PATENT OFFICE
CERTIFICATE OF CORRECTION

Patent No. 3,737,416  Dated June 5, 1973

Inventor(s) AKIHIRO KAWASAKI et al     Page 3

It is certified that error appears in the above-identified patent and that said Letters Patent are hereby corrected as shown below:

Column 10, line 44 - Delete "tolune" and rewrite as ---toluene---

Column 11, Table 6, fourth column - Re Examples 2, 3 and 4, delete "Same as above...do (second occurrence)---" and replace with

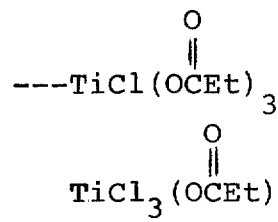

Same as above---;

last column, re Example 1, insert ---7---.

Columns 15 and 16, Table 9, fourth column - Re Example 1, compound should be written as

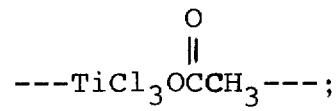

last column, in main heading, after

"butadiene and", delete ---copolymer of---.

-3-

Signed and Sealed this ninth Day of September 1975

[SEAL]

Attest:

RUTH C. MASON  
*Attesting Officer*

C. MARSHALL DANN  
*Commissioner of Patents and Trademarks*

UNITED STATES PATENT OFFICE
CERTIFICATE OF CORRECTION

Patent No. 3,737,416  Dated June 5, 1973

Inventor(s) AKIHIRO KAWASAKI et al  Page 4

It is certified that error appears in the above-identified patent and that said Letters Patent are hereby corrected as shown below:

Column 16, line 69 - Rewrite "vary" as ---varying---.

Column 18, Example 16, line 8 - Rewrite "mililiters" as

---milliliters---.

Columns 7, 9, 11, 12, 13, 15, 17, 18 and 19 - Tables 1-12 -

In all Tables, column 1 thereof, delete

"Example number" and replace with

---Experiment number---.

Signed and Sealed this ninth Day of September 1975

[SEAL]

Attest:

RUTH C. MASON  
Attesting Officer

C. MARSHALL DANN  
Commissioner of Patents and Trademarks